(12) United States Patent
Iwashita et al.

(10) Patent No.: US 8,664,897 B2
(45) Date of Patent: Mar. 4, 2014

(54) MOTOR DRIVE APPARATUS HAVING POWER FAILURE DETECTION UNIT FOR DETERMINING PRESENCE OR ABSENCE OF POWER FAILURE

(75) Inventors: Yasusuke Iwashita, Yamanashi (JP); Tadashi Okita, Yamanashi (JP); Masakazu Niwa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/612,975

(22) Filed: Sep. 13, 2012

(65) Prior Publication Data

US 2013/0134910 A1    May 30, 2013

(30) Foreign Application Priority Data

Nov. 30, 2011   (JP) .................................. 2011-262064

(51) Int. Cl.
*H02P 3/14*   (2006.01)
(52) U.S. Cl.
CPC ....................................... *H02P 3/14* (2013.01)
USPC ............................ 318/376; 318/375; 318/362
(58) Field of Classification Search
CPC ......................................................... H02P 3/14
USPC .......................................... 318/376, 375, 362
See application file for complete search history.

(56) References Cited

U.S. PATENT DOCUMENTS

| | | | |
|---|---|---|---|
| 5,241,255 A * | 8/1993 | Oshima et al. | ................ 318/801 |
| 6,380,715 B1 | 4/2002 | Kubo | |
| 7,450,355 B2 * | 11/2008 | Ochiai | ............................ 361/31 |
| 2006/0033466 A1 | 2/2006 | Yamada et al. | |
| 2011/0182398 A1 | 7/2011 | Iwashita et al. | |

FOREIGN PATENT DOCUMENTS

| | | |
|---|---|---|
| CN | 1767301 A | 5/2006 |
| CN | 102142669 A | 8/2011 |
| GB | 2419478 B | 3/2007 |
| JP | 06-169501 A1 | 6/1994 |

(Continued)

OTHER PUBLICATIONS

Notice of Reasons for Rejection issued in application No. 2011-262064 mail date Jan. 22, 2013.

(Continued)

*Primary Examiner* — Bentsu Ro
*Assistant Examiner* — David Luo
(74) *Attorney, Agent, or Firm* — Lowe Hauptman & Ham, LLP

(57) ABSTRACT

A motor drive apparatus includes a rectifier which converts AC power to DC power and DC power to AC power, an inverter which converts the DC power output by the rectifier to AC power and supplies the AC power to a motor, and which converts regenerative power from the motor to DC power and returns the DC power to the rectifier, a DC voltage detection unit which detects a DC output voltage of the rectifier, an AC voltage detection unit which detects an AC output voltage of the rectifier, a frequency calculation unit which calculates the frequency of the AC voltage; a storage unit which stores as a reference value the DC voltage at the start of the regenerative operation, and a power failure detection unit which determines the presence or absence of a power failure by using the DC voltage, the reference value, and the AC voltage frequency.

4 Claims, 15 Drawing Sheets

(56) References Cited

FOREIGN PATENT DOCUMENTS

| | | |
|---|---|---|
| JP | 06-189411 A1 | 7/1994 |
| JP | 11-069846 | 3/1999 |
| JP | 2001-169554 | 6/2001 |
| JP | 2006-014546 A1 | 1/2006 |
| JP | 200654947 | 2/2006 |
| JP | 2006158155 | 6/2006 |

OTHER PUBLICATIONS

Office Action dated Oct. 10, 2013, corresponds to Chinese patent application No. 201210505566.0.

* cited by examiner

US 8,664,897 B2

MOTOR DRIVE APPARATUS HAVING POWER FAILURE DETECTION UNIT FOR DETERMINING PRESENCE OR ABSENCE OF POWER FAILURE

RELATED APPLICATIONS

The present application is based on, and claims priority from, Japanese Application Number 2011-262064, filed Nov. 30, 2011, the disclosure of which is hereby incorporated by reference herein in its entirety.

BACKGROUND OF THE INVENTION

1. Field of the Invention

The present invention relates to a motor drive apparatus which supplies drive power to a motor by first converting AC power supplied from an AC power supply to DC power and then converting the DC power to AC power for driving the motor, and more particularly, the invention relates to a motor drive apparatus having a power failure detection unit for determining the presence or absence of a power failure.

2. Description of the Related Art

In a motor drive apparatus for driving motors used in such machines as machine tools, forging presses, injection molding machines, and various kinds of robots, a motor speed, torque, or rotor position command is generated to control the operation of each of the motors provided one for each drive axis. FIG. 8 is a diagram showing the configuration of a conventional motor drive apparatus for driving a plurality of motors. It is to be understood that, throughout the different drawings given herein, the same reference numerals designate component elements having the same functions. The motor drive apparatus 100 includes a 120-degree conduction mode rectifier 11 which converts AC power supplied from a commercial AC three-phase power supply 3 to DC power, and an inverter 12 which converts the DC power output by the 120-degree conduction mode rectifier 11 to AC power of a desired frequency and supplies the AC power as drive power to a motor 2, or which converts AC power regenerated by the motor 2 to DC power, and the motor drive apparatus 100 controls the speed, torque, or rotor position of the motor 2 connected to the AC side of the inverter 12.

For every inverter 12 there are motors 2 provided in order to drive and control the motors 2 by separately supplying drive power to each of the motors 2 provided one for each of the plurality of drive axes. On the other hand, usually only one 120-degree conduction mode rectifier 11 is provided for the plurality of inverters 12 in order to save the cost and installation space of the motor drive apparatus 100.

When the motor is being decelerated under the control of the motor drive apparatus 100, regenerative power is produced by the motor 2. The regenerative power is fed through the inverter 12 back to the 120-degree conduction mode rectifier 11. Since the 120-degree conduction mode rectifier 11 is a relatively low-cost rectifier having a power regeneration function for returning power recovered during motor deceleration to the power supply, and is capable not only of powering operation for converting AC power to DC power but also of regenerative operation for converting DC power back to AC power, the 120-degree conduction mode rectifier 11 can feed the regenerative energy recovered through the inverter 12 back into the AC line connecting to the commercial three-phase AC power supply 3.

In the motor drive apparatus 100, if a power failure occurs on the AC side of the 120-degree conduction mode rectifier 11, the input supply voltage drops, and the motor 2 becomes unable to continue normal operation. To avoid such a situation, it is standard practice to provide a power failure detection unit 52 on the AC side of the 120-degree conduction mode rectifier 11 so that, when the occurrence of a power failure is detected by the power failure detection unit 52, the operation of the motor drive apparatus 100 is switched so as to protect the motor drive apparatus 100, the tool connected to each motor being driven by the motor drive apparatus 100, the object being worked on by the tool, etc. The power failure detection unit 52 detects the presence or absence of a power failure based on the AC voltage detected by an AC voltage detection unit 51. In normal operation when no power failure is detected by the power failure detection unit 52, a host control apparatus 53 sets a switch 55-1 ON and a switch 55-2 OFF in a switch unit 55. With this setting, the AC power from the commercial three-phase AC power supply 3 is converted by the 120-degree conduction mode rectifier 11 into DC power which is supplied to each inverter 12. The host control apparatus 53 sends a motor drive command to each inverter 12 and controls the DC-to-AC conversion operation of the inverter 12 (more specifically, the switching operation of the switching device in the inverter 12) so that desired AC power is output from the inverter 12. Since the AC power output from the inverter 12 is used as the drive power to drive the motor 2, the speed, torque, or rotor position of the motor 2 connected to the AC side of the inverter 12 can be controlled by controlling the AC power to be output from the inverter 12. On the other hand, when a power failure is detected by the power failure detection unit 52 based on the AC voltage detected by the AC voltage detection unit 51, the host control apparatus 53 sets the switch 55-1 OFF and the switch 55-2 ON in the switch unit 55. As a result, DC power stored in a power storage device 54 is supplied to each inverter 12. The host control apparatus 53 transmits to each inverter 12 a motor drive command for protecting the motor drive apparatus 100, the tool connected to each motor being driven by the motor drive apparatus 100, and the object being worked on by the tool.

FIG. 9 is a circuit diagram for explaining currents flowing in the 120-degree conduction mode rectifier during the powering operation by the conventional motor drive apparatus. In the illustrated example, each inverter 12 connected to the 120-degree conduction mode rectifier 11 via a smoothing capacitor C is omitted from illustration. When supplying drive power to the motor, the 120-degree conduction mode rectifier 11 turns off the switches $SW_{R1}$, $SW_{R2}$, $SW_{S1}$, $SW_{S2}$, $SW_{T1}$, and $SW_{T2}$ on all of the R-, S-, and T-phases. This operation mode will hereinafter be referred to as "powering operation of the 120-degree conduction mode rectifier." During the powering operation of the 120-degree conduction mode rectifier 11, if there is current from the commercial three-phase AC power supply 3, for example, on the R-phase in a given cycle, this AC current is output to the DC side through a diode $D_{R1}$ on the R-phase, and the current from the DC side returns to the commercial three-phase AC power supply 3 through a diode $D_{T2}$ on the T-phase. The same is applied for other phase currents that can occur at other times.

FIG. 10 is a circuit diagram for explaining currents flowing in the 120-degree conduction mode rectifier during the regenerative operation by the conventional motor drive apparatus. In the illustrated example, each inverter 12 connected to the 120-degree conduction mode rectifier 11 via the smoothing capacitor C is omitted from illustration. The 120-degree conduction mode rectifier 11 controls the on/off operations of the switches $SW_{R1}$, $SW_{R2}$, $SW_{S1}$, $SW_{S2}$, $SW_{T1}$, and $SW_{T2}$ on the R-, S-, and T-phases as needed so that the regenerative power recovered from the motor 2 via the inverter is converted to AC power and returned to the commercial three-phase AC power supply 3. This operation mode will hereinafter be referred to as "regenerative operation of the 120-degree conduction mode rectifier." During the regenerative operation of the 120-degree conduction mode rectifier 11, the R-phase switch $SW_{R1}$ and the T-phase switch $SW_{T2}$ is turned on at a given time and the other switches $SW_{R2}$, $SW_{S1}$, $SW_{S2}$, and $SW_{T1}$ are turned off. As a result, the current that occurs when the regenerative power from the motor 2 at the given time is fed back to the 120-degree conduction mode rectifier 11 via the inverter is passed via the R-phase switch $SW_{R1}$ back to the commercial three-phase AC power supply 3, and the current from the commercial three-phase AC power supply 3 is supplied to the DC side via the T-phase switch $SW_{T2}$. The same is applied for R-phase and T-phase currents that can occur at other times.

As a method for determining a power failure in the motor drive apparatus, Japanese Unexamined Patent Publication No. 2006-14546, for example, discloses a method that converts the three-phase AC input voltage into a voltage vector in a two-phase coordinate system, calculates the amplitude of the input voltage from the amplitude of the vector, and determines that a power failure has occurred when the condition in which the amplitude value is lower than a predetermined reference voltage value has continued for a predetermined reference period of time. FIG. 11 is a circuit diagram showing a power failure detection unit for determining the presence or absence of a power failure based on the amplitude of the three-phase AC input voltage. The voltage from the commercial three-phase AC power supply 3 is detected by an AC voltage detection unit 122, and the amplitude of the voltage is calculated by a voltage amplitude detection unit 126. When the condition in which the value of the voltage amplitude calculated by the voltage amplitude detection unit 126 is lower than a predetermined reference voltage value has continued for a predetermined reference period of time, the power failure detection unit 125 determines that a power failure has occurred.

As another method for determining a power failure in the motor drive apparatus, Japanese Unexamined Patent Publication Nos. H06-169501 and H06-189411, for example, propose a method that calculates the frequency of the input voltage (power supply frequency) and determines that a power failure has occurred when the frequency calculated falls outside a predetermined range. FIG. 12 is a circuit diagram showing a power failure detection unit for determining the presence or absence of a power failure based on the frequency of the three-phase AC input voltage, and FIG. 13 is a diagram for explaining the basic concept of the power failure detection unit that determines the presence or absence of a power failure based on the frequency of the three-phase AC input voltage. The voltage from the commercial three-phase AC power supply 3 is detected by an AC voltage detection unit 122, and the frequency is calculated by a frequency calculation unit 123. The power failure detection unit 125 determines, based on the frequency calculated by the frequency calculation unit 123, the presence or absence of a power failure on the AC side of the 120-degree conduction mode rectifier 11. For example, a predetermined range of frequencies centered about the commercial power supply frequency (50 Hz or 60 Hz) is predefined as a normal frequency range, as shown in FIG. 13. As long as there is no power failure on the AC side of the 120-degree conduction mode rectifier 11, the frequency calculated by the frequency calculation unit 123 shows a substantially constant value, but when a power failure occurs, for example, at time A in FIG. 13, the frequency being calculated by the frequency calculation unit 123 begins to fluctuate. In the illustrated example, the frequency is shown as gradually increasing after the occurrence of the power failure but, depending on the situation of the power failure, the frequency may decrease, oscillate, or diverge. Then, when the frequency deviates outside the normal frequency range at time B, the power failure detection unit 125 determines that a power failure has occurred on the AC side of the 120-degree conduction mode rectifier 11.

With the method that detects the occurrence of a power failure based on the amplitude of the three-phase AC input voltage, such as disclosed in the above-cited Japanese Unexamined Patent Publication No. 2006-14546, when a 120-degree conduction mode rectifier is used as the converter for converting the AC power supplied from the commercial three-phase AC power supply to DC power, if a power failure occurs during the regenerative operation of the 120-degree conduction mode rectifier, it is not possible to detect the power failure. FIGS. 14 and 15 are diagrams for explaining the problem associated with the power failure detection performed based on the voltage amplitude when the 120-degree conduction mode rectifier is used: FIG. 14 shows the power failure detection during the powering operation of the 120-degree conduction mode rectifier, and FIG. 15 shows the power failure detection during the regenerative operation of the 120-degree conduction mode rectifier. In the illustrated example, each inverter 12 connected to the 120-degree conduction mode rectifier 11 via the smoothing capacitor C is omitted from illustration.

As shown in FIG. 14, when a power failure occurs on the AC side of the 120-degree conduction mode rectifier 11 during the powering operation of the 120-degree conduction mode rectifier 11 by the motor drive apparatus, since the switches $SW_{R1}$, $SW_{R2}$, $SW_{S1}$, $SW_{S2}$, $SW_{T1}$, and $SW_{T2}$ in the 120-degree conduction mode rectifier 11 are all OFF, the voltage that the voltage detection unit 122 detects on the AC side of the 120-degree conduction mode rectifier 11 drops to almost zero, upon detection of which it can be determined that a power failure has occurred on the AC side.

However, as shown in FIG. 15, when a power failure occurs on the AC side of the 120-degree conduction mode rectifier 11 during the regenerative operation of the 120-degree conduction mode rectifier 11 by the motor drive apparatus, since the DC output voltage appears at the voltage detection unit 122 through the ON switches, the voltage amplitude does not drop, and therefore, it is not possible to detect the power failure. In the illustrated example, since the switches $SW_{R1}$ and $SW_{T2}$ are ON, the DC output voltage appears on the AC side of the 120-degree conduction mode rectifier 11 through the switches $SW_{R1}$ and $SW_{T2}$. As a result, even when a power failure has actually occurred, it is not possible to detect the occurrence of the power failure, because the amplitude of the voltage on the AC side of the 120-degree conduction mode rectifier 11 does not drop.

On the other hand, in the case of the method that determines the presence or absence of a power failure based on the frequency of the three-phase AC input voltage, such as disclosed in the above-cited Japanese Unexamined Patent Publication Nos. H06-169501 and H06-189411, unlike the method that determines the presence or absence of a power failure based on the amplitude of the three-phase AC input voltage, the occurrence of a power failure at the AC power supply side can be detected even during the regenerative operation of the 120-degree conduction mode rectifier. However, if the normal frequency range is narrowed in order to advance the power failure detection timing, the possibility of an erroneous power failure detection increases; conversely, if the normal frequency range is widened in order to prevent an erroneous power failure detection, the time taken to detect the occurrence of a power failure increases, resulting in an inability to protect the motor drive apparatus, the tool connected to each motor being driven by the motor drive apparatus, the object being worked on by the tool, etc. FIGS. 16 and 17 are diagrams for explaining the problem associated with the power failure detection performed based on the voltage frequency when the 120-degree conduction mode rectifier is used: FIG. 16 shows the power failure detection when the normal frequency range is narrowed, and FIG. 17 shows the power failure detection when the normal frequency range is widened.

When the normal frequency range is narrowed in order to advance the power failure detection timing, as shown in FIG. 16, if a power failure occurs, for example, at time D in FIG. 16, the frequency being calculated by the frequency calculation unit 123 begins to fluctuate (increase in the example of FIG. 16), and when the frequency deviates outside the normal frequency range at time E, the power failure detection unit 125 determines that a power failure has occurred on the AC side of the 120-degree conduction mode rectifier 11. The narrower the normal frequency range, the shorter the time taken to detect abnormality in frequency, i.e., the time taken from the moment a power failure occurs (time D) to the moment the power failure is detected (time E). The fluctuation of the power frequency that occurs when a power failure occurs during the regenerative operation of the 120-degree conduction mode rectifier depends on the load of the motor drive apparatus and the impedance, and there are cases where the fluctuation is mild; therefore, from the standpoint of detecting a power failure early, it is desirable that the detection sensitivity to the frequency fluctuation be higher. However, the actual frequency (50 Hz or 60 Hz) of the commercial three-phase AC power supply 3 more or less fluctuates even during normal operation and, even when there is no power failure, the frequency may deviate outside the normal frequency range, as indicated at C in FIG. 16, depending on the way the frequency fluctuates. For example, when the AC power supply is a small-sized power supply implemented in a distributed power supply system, the frequency fluctuation is large, and the possibility of an erroneous power failure detection increases.

On the other hand, when the normal frequency range is widened in order to prevent an erroneous power failure detection, as shown in FIG. 17, if a power failure occurs, for example, at time F in FIG. 17, the frequency being calculated by the frequency calculation unit 123 begins to fluctuate (increase in the example of FIG. 17), but the length of time that elapses until reaching time G at which the power failure detection unit 125 determines that a power failure has occurred on the AC side of the 120-degree conduction mode rectifier 11 increases. This increases the possibility that the motor drive apparatus, the tool connected to each motor being driven by the motor drive apparatus, the object being worked on by the tool, etc., may not be protected before damage is caused.

SUMMARY OF THE INVENTION

In view of the above problems, it is an object of the present invention to provide a motor drive apparatus that can protect the apparatus by quickly detecting a power failure at the AC power supply side even during the regenerative operation of the 120-degree conduction mode rectifier, while making provisions to eliminate the possibility of an erroneous power failure detection.

To achieve the above object, a motor drive apparatus includes, a 120-degree conduction mode rectifier which, during powering operation, converts AC power supplied from an AC side to DC power for output and, during regenerative operation, converts DC power supplied from a DC side to AC power for output, an inverter which, during powering operation, converts the DC power output by the 120-degree conduction mode rectifier to AC power and supplies the AC power as drive power to a motor, and which, during regenerative operation, converts regenerative AC power recovered from the motor to DC power and returns the DC power to the 120-degree conduction mode rectifier, a DC voltage detection unit which detects a DC voltage on the DC output side of the 120-degree conduction mode rectifier, an AC voltage detection unit which detects an AC voltage on the AC output side of the 120-degree conduction mode rectifier, a frequency calculation unit which calculates the frequency of the AC voltage detected by the AC voltage detection unit, a storage unit which stores as a reference value the DC voltage detected by the DC voltage detection unit at the start of the regenerative operation of the 120-degree conduction mode rectifier, and a power failure detection unit which determines the presence or absence of a power failure on the AC side of the 120-degree conduction mode rectifier during the regenerative operation of the 120-degree conduction mode rectifier, by using the DC voltage detected by the DC voltage detection unit, the reference value stored in the storage unit, and the AC voltage frequency calculated by the frequency calculation unit.

The power failure detection unit includes, a voltage evaluation unit which determines whether the DC voltage detected by the DC voltage detection unit during the regenerative operation of the 120-degree conduction mode rectifier is larger than the reference value, and a frequency abnormality detection unit which determines whether the AC voltage frequency calculated by the frequency calculation unit is outside a normal frequency range when it is determined by the voltage evaluation unit that the DC voltage detected by the DC voltage detection unit during the regenerative operation of the 120-degree conduction mode rectifier is larger than the reference value, and wherein when the frequency abnormality detection unit has detected that the AC voltage frequency calculated by the frequency calculation unit has been outside the normal frequency range continuously for a predetermined period of time, the power failure detection unit determines that a power failure has occurred on the AC side of the 120-degree conduction mode rectifier.

The motor drive apparatus further includes an amplitude calculation unit which calculates the amplitude of the AC voltage detected by the AC voltage detection unit, and the power failure detection unit includes: a voltage evaluation unit which determines whether the DC voltage detected by the DC voltage detection unit during the regenerative operation of the 120-degree conduction mode rectifier is larger than the reference value, a frequency abnormality detection unit which determines whether the AC voltage frequency calculated by the frequency calculation unit is outside the normal frequency range when it is determined by the voltage evaluation unit that the DC voltage detected by the DC voltage detection unit during the regenerative operation of the 120-degree conduction mode rectifier is larger than the reference value, a regeneration stopping unit which causes the DC-to-AC power conversion operation of the 120-degree conduction mode rectifier to stop when the frequency abnormality detection unit has detected that the AC voltage frequency calculated by the frequency calculation unit has been outside the normal frequency range continuously for a predetermined period of time, and an amplitude evaluation unit which detects whether or not the AC voltage amplitude calculated by the amplitude calculation unit is equal to or smaller than a predetermined value, and wherein after the conversion operation of the 120-degree conduction mode rectifier has been caused to stop by the regeneration stopping unit, if the amplitude evaluation unit has detected that the AC voltage amplitude calculated by the amplitude calculation unit is equal to or smaller than the predetermined value, the power failure detection unit determines that a power failure has occurred on the AC side of the 120-degree conduction mode rectifier.

The above normal frequency range may be defined as a range of frequencies centered about the frequency calculated by the frequency calculation unit at the start of the regenerative operation of the 120-degree conduction mode rectifier.

BRIEF DESCRIPTION OF THE DRAWINGS

The present invention will be more clearly understood with reference to the following accompanying drawings.

DETAILED DESCRIPTION

A motor drive apparatus having a power failure detection unit for determining the presence or absence of a power failure will be described below with reference to the drawings. It should, however, be understood that the present invention is not limited to the accompanying drawings, nor is it limited to the particular embodiments described herein.

While each of the embodiments described herein deals with a motor drive apparatus for driving and controlling a plurality of motors, the number of motors to be driven and controlled does not limit the present invention.

Figure 1:
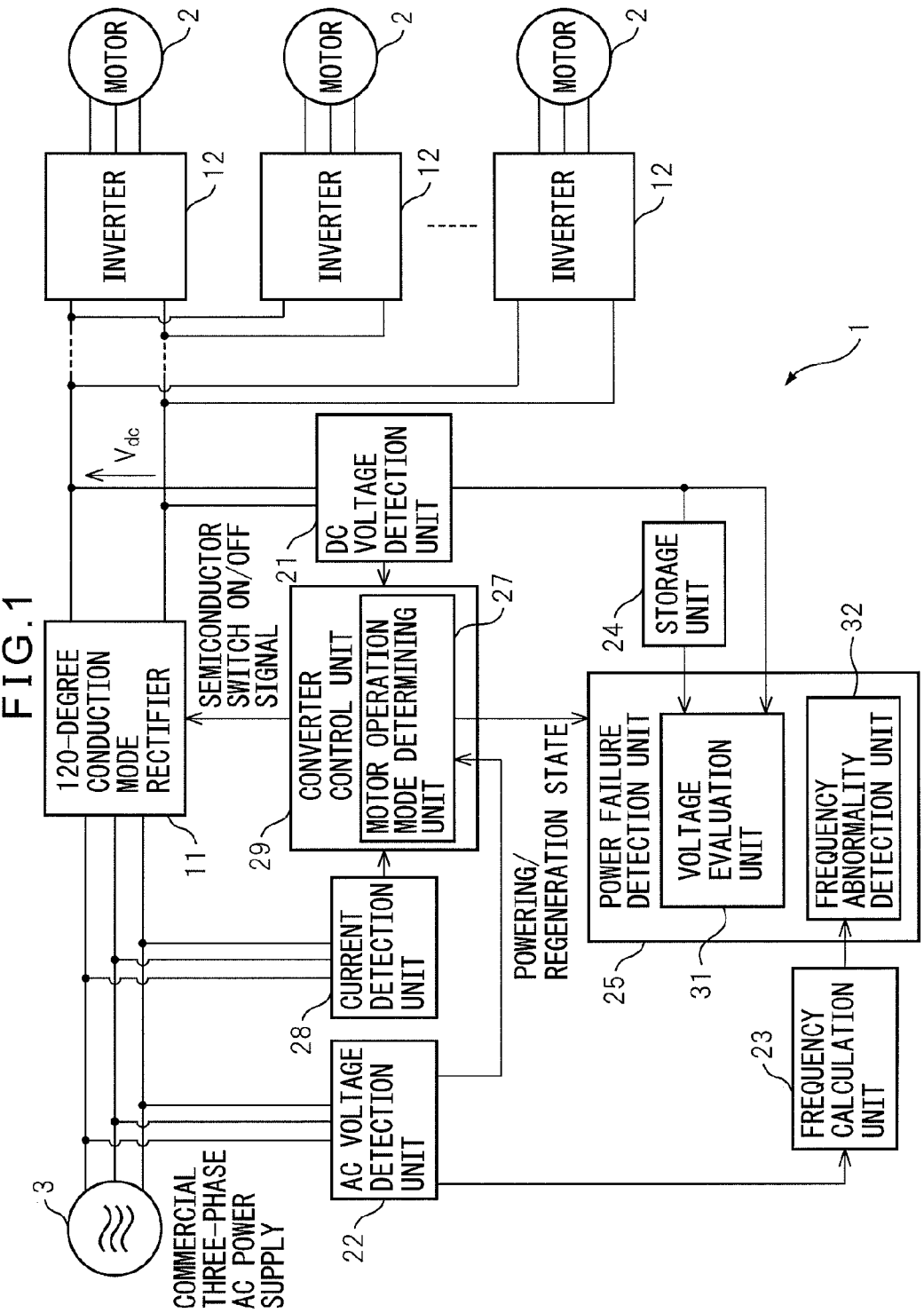
FIG. 1 is a circuit diagram showing a motor drive apparatus according to a first embodiment of the present invention.

FIG. 1 is a circuit diagram showing a motor drive apparatus according to a first embodiment of the present invention. The motor drive apparatus 1 for driving motors 2, according to the first embodiment of the present invention, includes a 120-degree conduction mode rectifier 11, inverters 12, a DC voltage detection unit 21, an AC voltage detection unit 22, a frequency calculation unit 23, a storage unit 24, and a power failure detection unit 25.

The 120-degree conduction mode rectifier 11 is a power converter capable of converting power from AC to DC and DC to AC; more specifically, during powering operation, the converter converts AC power supplied from a commercial three-phase AC power supply 3 to DC power for output, and during regenerative operation, the converter converts DC power, supplied from the inverter 12 by converting regenerative power recovered from the motor 2, to AC power for output.

Each inverter 12 is connected to the 120-degree conduction mode rectifier 11 via a DC link; during powering operation, the inverter 12 converts the DC power output by the 120-degree conduction mode rectifier 11 to AC power and supplies the AC power as drive power to the motor 2, and during the regenerative operation, the inverter 12 converts regenerative AC power recovered from the motor 2 to DC power and returns the DC power to the 120-degree conduction mode rectifier 11.

The DC voltage detection unit 21 detects the DC voltage on the DC output side of the 120-degree conduction mode rectifier 11. On the other hand, the AC voltage detection unit 22 detects the AC voltage on the AC output side of the 120-degree conduction mode rectifier 11.

The frequency calculation unit 23 calculates the frequency of the AC voltage detected by the AC voltage detection unit 22.

The storage unit 24 stores as a reference value the DC voltage detected by the DC voltage detection unit 21 at the start of the regenerative operation of the 120-degree conduction mode rectifier 11.

When the regenerative operation of the 120-degree conduction mode rectifier 11 is started a short time after the occurrence of regenerative power from the motor 2, the DC voltage on the DC output side of the 120-degree conduction mode rectifier 11 should thereafter drop below the DC voltage immediately after the start of the regenerative operation of the 120-degree conduction mode rectifier 11, but if the DC output voltage after a short time from the start of the regenerative operation of the 120-degree conduction mode rectifier 11 is larger than the DC voltage immediately after the start of the regenerative operation of the 120-degree conduction mode rectifier 11, this means that the energy is not flowing from the DC side to the AC side of the 120-degree conduction mode rectifier 11, i.e., it is highly likely that a power failure has occurred on the AC side of the 120-degree conduction mode rectifier 11. In view of this, in the present invention, the power failure detection unit 25 determines the presence or absence of a power failure on the AC side of the 120-degree conduction mode rectifier 11 during the regenerative operation of the 120-degree conduction mode rectifier 11, by using the DC voltage detected by the DC voltage detection unit 21, the reference value stored in the storage unit 24, and the AC voltage frequency calculated by the frequency calculation unit 23. The power failure detection unit 25 is implemented by an operational processor such as a DSP or an FPGA, and its operation is defined by a software program.

The configuration and operation of the power failure detection unit 25 according to the first embodiment of the present invention will be described in further detail below. The power failure detection unit 25 according to the first embodiment of the present invention determines that a power failure has occurred on the AC side of the 120-degree conduction mode rectifier 11 when the following two conditions are simultaneously satisfied: the first condition is that the DC voltage detected by the DC voltage detection unit 21 during the regenerative operation of the 120-degree conduction mode rectifier 11 is larger than the reference value which is the DC voltage detected by the DC voltage detection unit 21 at the start of the regenerative operation of the 120-degree conduction mode rectifier 11, and the second condition is that a frequency abnormality detection unit has detected that the AC voltage frequency calculated by the frequency calculation unit 23 has been outside the normal frequency range continuously for a predetermined period of time. With this provision, it is possible to advance the power failure detection timing by narrowing the normal frequency range, because the occurrence of a power failure is determined only when both of the first and second conditions are satisfied. For example, during the powering operation of the 120-degree conduction mode rectifier 11, if the frequency abnormality detection unit has detected that the AC voltage frequency calculated by the frequency calculation unit 23 has been outside the normal frequency range continuously for the predetermined period of time, there is no possibility of erroneously detecting a power failure, since the first condition is not satisfied.

Accordingly, the power failure detection unit 25 according to the first embodiment of the present invention includes, a voltage evaluation unit 31 which determines whether the DC voltage detected by the DC voltage detection unit 21 during the regenerative operation of the 120-degree conduction mode rectifier 11 is larger than the reference value which is the DC voltage detected by the DC voltage detection unit 21 at the start of the regenerative operation of the 120-degree conduction mode rectifier 11, and the frequency abnormality detection unit 32 which determines whether the AC voltage frequency calculated by the frequency calculation unit 23 is outside the normal frequency range when it is determined by the voltage evaluation unit 31 that the DC voltage detected by the DC voltage detection unit 21 during the regenerative operation of the 120-degree conduction mode rectifier 11 is larger than the reference value. When the frequency abnormality detection unit has detected that the AC voltage frequency calculated by the frequency calculation unit 23 has been outside the normal frequency range continuously for the predetermined period of time, the power failure detection unit 25 determines that a power failure has occurred on the AC side of the 120-degree conduction mode rectifier 11. As described above, the motor drive apparatus 1 according to the first embodiment of the present invention determines the presence or absence of a power failure during the regenerative operation of the 120-degree conduction mode rectifier 11, by using the reference value, i.e., the DC voltage detected by the DC voltage detection unit 21 at the start of the regenerative operation of the 120-degree conduction mode rectifier 11, in this case, after the regenerative operation of the 120-degree conduction mode rectifier 11 is terminated and switched to the powering operation, when the regenerative operation of the 120-degree conduction mode rectifier 11 is started again, the motor drive apparatus 1 updates the reference value stored in the storage unit 24 by the DC voltage detected by the DC voltage detection unit 21 at the start of the new regenerative operation, and determines the presence or absence of a power failure during the new regenerative operation by using the updated reference value.

Figure 2:
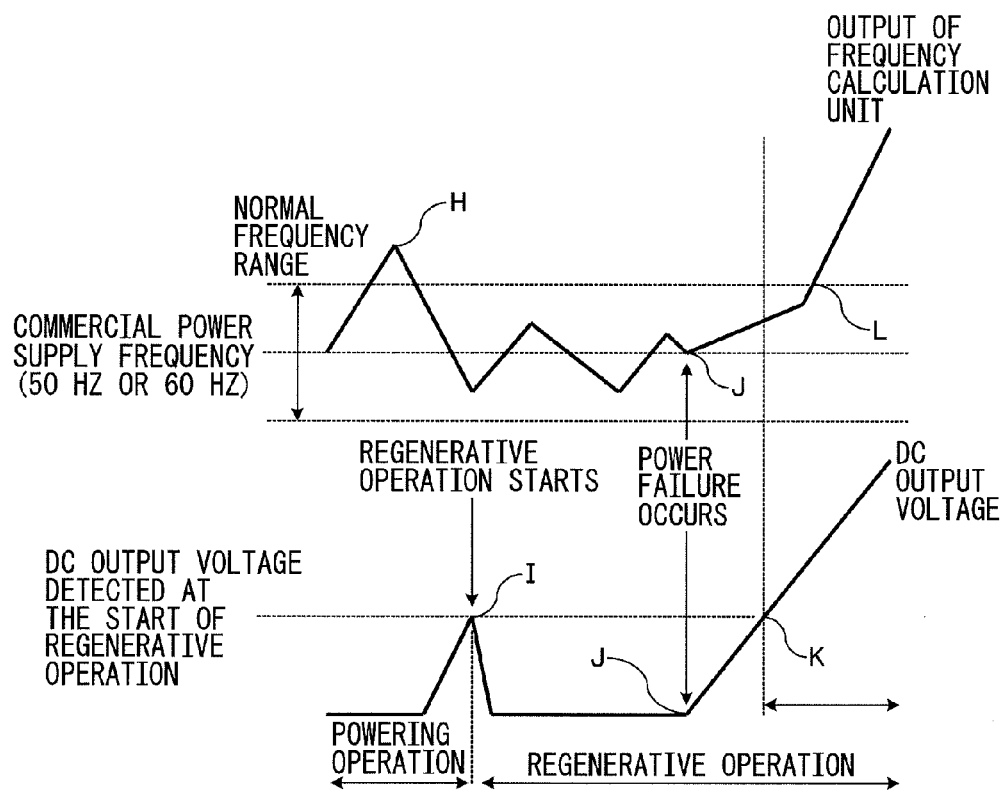
FIG. 2 is a diagram for explaining the operation of a power failure detection unit according to the first embodiment of the present invention.

FIG. 2 is a diagram for explaining the operation of the power failure detection unit according to the first embodiment of the present invention. As an example, consider the situation where the operation mode of the 120-degree conduction mode rectifier 11 is switched from powering operation to regenerative operation at time I under the control of the motor drive apparatus 1, and thereafter, at time J, a power failure occurs on the AC side of the 120-degree conduction mode rectifier 11.

As shown in FIG. 2, when the 120-degree conduction mode rectifier 11 is in powering operation under normal conditions with no power failure on the AC side of the 120-degree conduction mode rectifier 11, the DC voltage on the DC side of the 120-degree conduction mode rectifier 11 is substantially constant. In this situation, when regenerative power occurs from the motor 2, the regenerative power energy flows through the inverter 12 into the DC side of the 120-degree conduction mode rectifier 11; as a result, the DC voltage being detected by the DC voltage detection unit 21 begins to increase. When the DC voltage on the DC side of the 120-degree conduction mode rectifier 11 reaches a predetermined value, the operation mode of the 120-degree conduction mode rectifier 11 is switched from powering operation to regenerative operation (time I in FIG. 2) under the control of the motor drive apparatus 1, and the regenerative power energy begins to flow into the AC side of the 120-degree conduction mode rectifier 11; as a result, the DC voltage being detected by the DC voltage detection unit 21 begins to decrease. When a power failure occurs at time J in FIG. 2, the DC voltage being detected by the DC voltage detection unit 21 suddenly begins to increase, and the frequency being calculated by the frequency calculation unit 123 begins to fluctuate. The illustrated example shows as an example of the frequency fluctuation the case where the frequency being calculated by the frequency calculation unit 123 gradually increases. The storage unit 24 stores the reference value which is the DC voltage detected by the DC voltage detection unit 21 at the start of the regenerative operation of the 120-degree conduction mode rectifier 11 (at time I in FIG. 2), and the voltage evaluation unit 31 in the power failure detection unit 25 determines whether or not the DC voltage detected by the DC voltage detection unit 21 is larger than the reference value stored in the storage unit 24. When it is determined at time K in FIG. 2 that the DC voltage detected by the DC voltage detection unit 21 is larger than the reference value stored in the storage unit 24, the frequency abnormality detection unit 32 in the power failure detection unit 25 then determines whether or not the AC voltage frequency calculated by the frequency calculation unit 23 is outside the normal frequency range. At time L in FIG. 2, the AC voltage frequency calculated by the frequency calculation unit 23 deviates outside the normal frequency range; then, when the frequency abnormality detection unit 32 has detected that the AC voltage frequency calculated by the frequency calculation unit 23 has been outside the normal frequency range continuously for the predetermined period of time, the power failure detection unit 25 determines that a power failure has occurred on the AC side of the 120-degree conduction mode rectifier 11. More specifically, when it is determined that the DC voltage detected by the DC voltage detection unit 21 is larger than the reference value stored in the storage unit 24 (at time K in FIG. 2) and when the frequency abnormality detection unit 32 has detected abnormality in frequency, the power failure detection unit 25 according to the first embodiment of the present invention determines that a power failure has occurred; as a result, if the normal frequency range is narrowed in order to advance the power failure detection timing, there is no possibility of erroneously determining that a power failure has occurred when actually no power failure has occurred. Further, if the AC voltage frequency calculated by the frequency calculation unit 23 has exceeded the upper limit of the normal frequency range for any reason at time H in FIG. 2 during the powering operation of the 120-degree conduction mode rectifier 11, since the 120-degree conduction mode rectifier 11 is not in regenerative operation, there is no possibility of the power failure detection unit 25 erroneously detecting the situation as the occurrence of a power failure.

Figure 3:
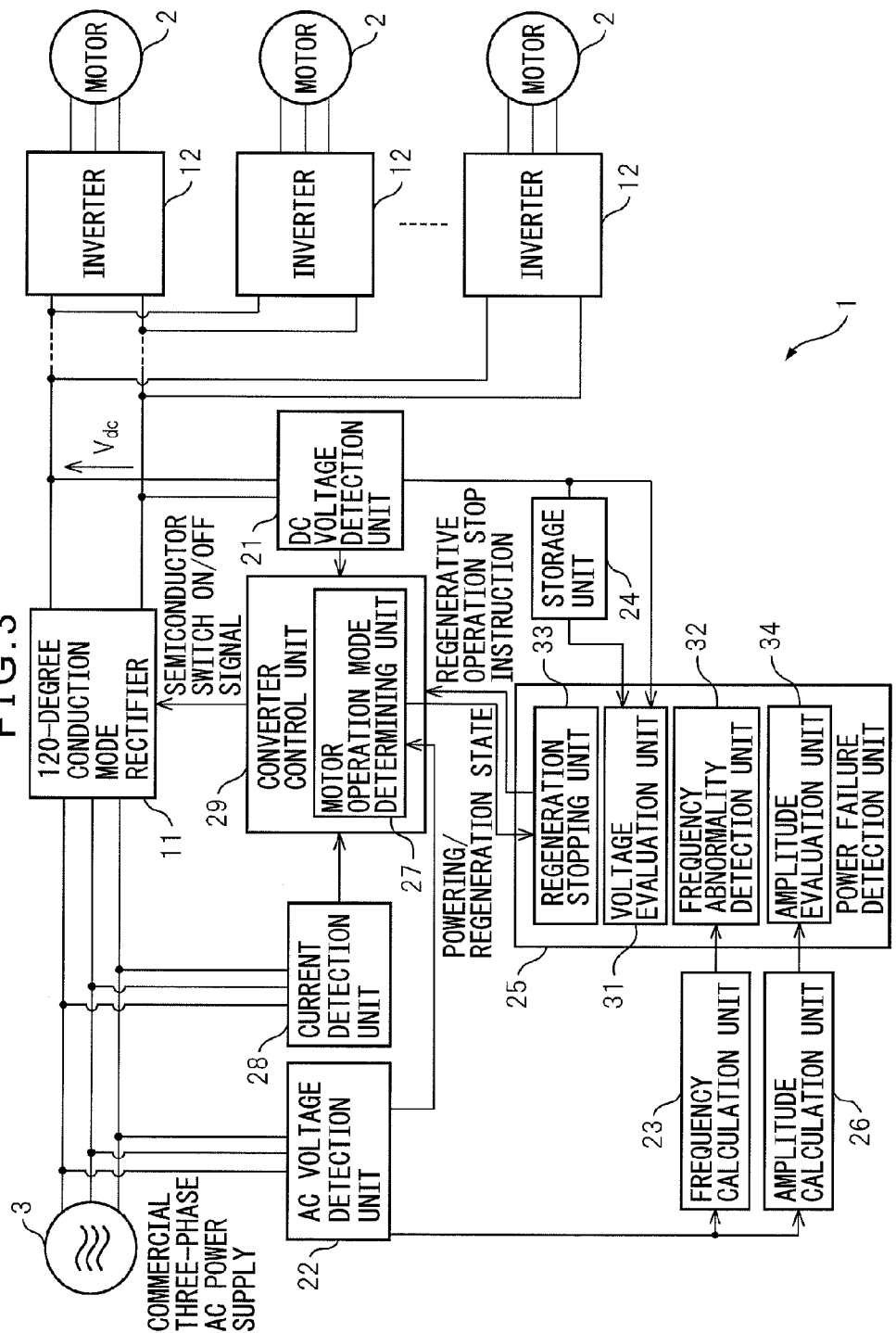
FIG. 3 is a circuit diagram showing a motor drive apparatus according to a second embodiment of the present invention.

Next, a second embodiment of the present invention will be described. FIG. 3 is a circuit diagram showing the motor drive apparatus according to the second embodiment of the present invention. The motor drive apparatus 1 according to the second embodiment of the present invention includes a 120-degree conduction mode rectifier 11, inverters 12, a DC voltage detection unit 21, an AC voltage detection unit 22, a frequency calculation unit 23, a storage unit 24, a power failure detection unit 25, and an amplitude calculation unit 26. The 120-degree conduction mode rectifier 11, the inverters 12, the DC voltage detection unit 21, the AC voltage detection unit 22, the frequency calculation unit 23, and the storage unit 24 in the second embodiment of the present invention are the same as the corresponding circuit component elements in the first embodiment, and therefore, the same circuit component elements will be designated by the same reference numerals and will not be described in further detail.

During the regenerative operation of the 120-degree conduction mode rectifier 11, the power failure detection unit 25 determines the presence or absence of a power failure on the AC side of the 120-degree conduction mode rectifier 11 by using the DC voltage detected by the DC voltage detection unit 21, the reference value stored in the storage unit 24, and the AC voltage frequency calculated by the frequency calculation unit 23. The power failure detection unit 25 is implemented by an operational processor such as a DSP or an FPGA, and its operation is defined by a software program.

The configuration and operation of the power failure detection unit 25 according to the second embodiment of the present invention will be described in further detail below. The power failure detection unit 25 according to the second embodiment of the present invention causes the DC-to-AC power conversion operation (i.e., regenerative operation) of the 120-degree conduction mode rectifier 11 to stop when the following two conditions are simultaneously satisfied: the first condition is that the DC voltage detected by the DC voltage detection unit 21 during the regenerative operation of the 120-degree conduction mode rectifier 11 is larger than the reference value which is the DC voltage detected by the DC voltage detection unit 21 at the start of the regenerative operation of the 120-degree conduction mode rectifier 11, and the second condition is that the frequency abnormality detection unit has detected that the AC voltage frequency calculated by the frequency calculation unit 23 has been outside the normal frequency range continuously for a predetermined period of time. When the regenerative operation of the 120-degree conduction mode rectifier 11 is stopped, the semiconductor switches in the 120-degree conduction mode rectifier 11 are all turned off; as a result, the AC voltage that the voltage detection unit 22 detects on the AC side of the 120-degree conduction mode rectifier 11 drops below the rated voltage of the commercial AC three-phase power supply 3. Accordingly, when the amplitude of the AC voltage detected by the AC voltage detection unit 22 drops to or below a predetermined value, it is determined that a power failure has occurred. The "predetermined value" may be set as desired by the user in accordance with the operating condition of the motor 2, etc., and may be set, for example, to a value equal to the rated voltage of the commercial AC three-phase power supply 3 minus several to several tens of percent of the rated voltage. Alternatively, the "predetermined value" may be set appropriately in accordance with the detection limit of the AC voltage detection unit 22.

By making provision to determine that a power failure has occurred when the amplitude of the AC voltage detected by the AC voltage detection unit 22 drops to or below the predetermined value, as described above, it becomes possible to advance the power failure detection timing by narrowing the normal frequency range, because the occurrence of a power failure is determined only when both of the first and second conditions are satisfied. For example, during the powering operation of the 120-degree conduction mode rectifier 11, if the frequency abnormality detection unit has detected that the AC voltage frequency calculated by the frequency calculation unit 23 has been outside the normal frequency range continuously for the predetermined period of time, there is no possibility of erroneously detecting the situation as the occurrence of a power failure, since the first condition is not satisfied.

Accordingly, the power failure detection unit 25 according to the second embodiment of the present invention includes, a voltage evaluation unit 31 which determines whether the DC voltage detected by the DC voltage detection unit 21 during the regenerative operation of the 120-degree conduction mode rectifier 11 is larger than the reference value, the frequency abnormality detection unit 32 which determines whether the AC voltage frequency calculated by the frequency calculation unit 23 is outside the normal frequency range when it is determined by the voltage evaluation unit 31 that the DC voltage detected by the DC voltage detection unit 21 during the regenerative operation of the 120-degree conduction mode rectifier 11 is larger than the reference value, a regeneration stopping unit 33 which causes the DC-to-AC power conversion operation of the 120-degree conduction mode rectifier 11 to stop when the frequency abnormality detection unit 32 has detected that the AC voltage frequency calculated by the frequency calculation unit 23 has been outside the normal frequency range continuously for the predetermined period of time, the amplitude calculation unit 26 which calculates the amplitude of the AC voltage detected by the AC voltage detection unit 22, and an amplitude evaluation unit 34 which detects whether or not the AC voltage amplitude calculated by the amplitude calculation unit 26 is equal to or smaller than the predetermined value. Then, after the conversion operation of the 120-degree conduction mode rectifier 11 has been caused to stop by the regeneration stopping unit 33, if the amplitude evaluation unit 34 has detected that the AC voltage amplitude calculated by the amplitude calculation unit 26 is equal to or smaller than the predetermined value, the power failure detection unit 25 determines that a power failure has occurred on the AC side of the 120-degree conduction mode rectifier 11. In the motor drive apparatus 1 according to the second embodiment of the present invention, after the regenerative operation of the 120-degree conduction mode rectifier 11 is terminated and switched to the powering operation, when the regenerative operation of the 120-degree conduction mode rectifier 11 is started again, the motor drive apparatus 1 updates the reference value stored in the storage unit 24 by the DC voltage detected by the DC voltage detection unit 21 at the start of the new regenerative operation, and determines the presence or absence of a power failure during the new regenerative operation by using the updated reference value.

Figure 4:
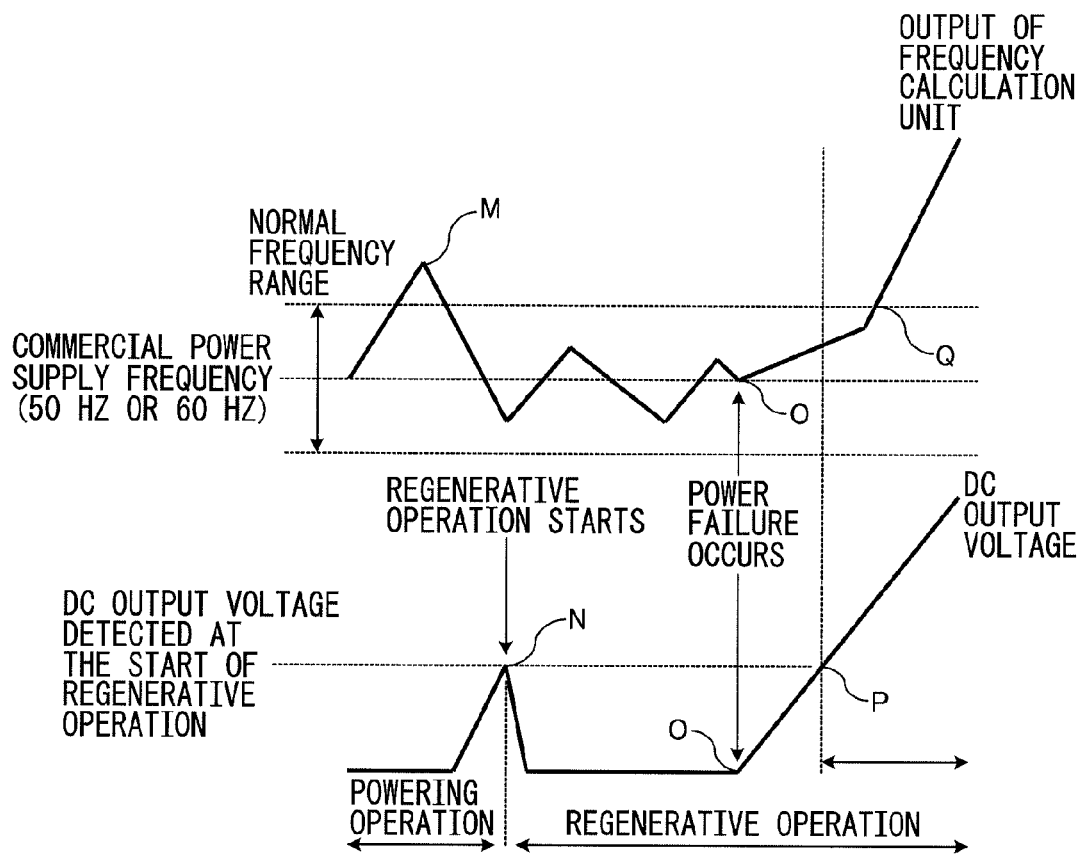
FIG. 4 is a diagram for explaining the operation of a power failure detection unit according to the second embodiment of the present invention.

FIG. 4 is a diagram for explaining the operation of the power failure detection unit according to the second embodiment of the present invention. As an example, if the operation mode of the 120-degree conduction mode rectifier 11 is switched from powering operation to regenerative operation at time N under the control of the motor drive apparatus 1, and thereafter, at time O, a power failure occurs on the AC side of the 120-degree conduction mode rectifier 11.

As shown in FIG. 4, when the 120-degree conduction mode rectifier 11 is in powering operation under normal conditions with no power failure on the AC side of the 120-degree conduction mode rectifier 11, the DC voltage on the DC side of the 120-degree conduction mode rectifier 11 is substantially constant. In this situation, when regenerative power occurs from the motor 2, the regenerative power energy flows through the inverter 12 into the DC side of the 120-degree conduction mode rectifier 11; as a result, the DC voltage being detected by the DC voltage detection unit 21 begins to increase. When the DC voltage on the DC side of the 120-degree conduction mode rectifier 11 reaches a predetermined value, the operation mode of the 120-degree conduction mode rectifier 11 is switched from powering operation to regenerative operation (time N in FIG. 4) under the control of the motor drive apparatus 1, and the regenerative power energy begins to flow into the AC side of the 120-degree conduction mode rectifier 11; as a result, the DC voltage being detected by the DC voltage detection unit 21 begins to decrease. When a power failure occurs at time O in FIG. 4, the DC voltage being detected by the DC voltage detection unit 21 suddenly begins to increase, and the frequency being calculated by the frequency calculation unit 123 begins to fluctuate. The illustrated example shows as an example of the frequency fluctuation the case where the frequency being calculated by the frequency calculation unit 123 gradually increases. The storage unit 24 stores the reference value which is the DC voltage detected by the DC voltage detection unit 21 at the start of the regenerative operation of the 120-degree conduction mode rectifier 11 (at time N), and the voltage evaluation unit 31 in the power failure detection unit 25 determines whether or not the DC voltage detected by the DC voltage detection unit 21 is larger than the reference value stored in the storage unit 24. When it is determined at time P in FIG. 4 that the DC voltage detected by the DC voltage detection unit 21 is larger than the reference value stored in the storage unit 24, the frequency abnormality detection unit 32 in the power failure detection unit 25 then determines whether or not the AC voltage frequency calculated by the frequency calculation unit 23 during the regenerative operation of the 120-degree conduction mode rectifier 11 is outside the normal frequency range. At time Q in FIG. 4, the AC voltage frequency calculated by the frequency calculation unit 23 deviates outside the normal frequency range; then, when the frequency abnormality detection unit 32 has detected that the AC voltage frequency calculated by the frequency calculation unit 23 has been outside the normal frequency range continuously for the predetermined period of time, the regeneration stopping unit 33 causes the DC-to-AC conversion operation of the 120-degree conduction mode rectifier 11 to stop. After that, when the amplitude evaluation unit 34 has detected that the amplitude of the voltage on the AC side of the 120-degree conduction mode rectifier 11 has dropped to or below the predetermined value, it is determined that a power failure has occurred on the AC side of the 120-degree conduction mode rectifier 11. More specifically, during the regenerative operation of the 120-degree conduction mode rectifier 11, only when it is determined that the DC voltage detected by the DC voltage detection unit 21 is larger than the reference value stored in the storage unit 24 and when the frequency abnormality detection unit 32 has detected abnormality in frequency, does the power failure detection unit 25 according to the second embodiment of the present invention determine that a power failure has occurred, in the same manner as the first embodiment; as a result, if the normal frequency range is narrowed in order to advance the power failure detection timing, there is no possibility of erroneously determining that a power failure has occurred when actually no power failure has occurred. Further, if the AC voltage frequency calculated by the frequency calculation unit 23 has exceeded the upper limit of the normal frequency range for any reason at time M in FIG. 4 during the powering operation of the 120-degree conduction mode rectifier 11, since the 120-degree conduction mode rectifier 11 is not in regenerative operation, there is no possibility of the power failure detection unit 25 erroneously detecting a power failure.

In the first and second embodiments of the present invention, the normal frequency range has been defined as a range of frequencies centered about the commercial power frequency (50 Hz or 60 Hz), but by considering the fact that the commercial power frequency fluctuates, the normal frequency range may be defined as a range of frequencies centered about the frequency calculated by the frequency calculation unit 23 at the start of the regenerative operation of the 120-degree conduction mode rectifier 11.

Figure 5:
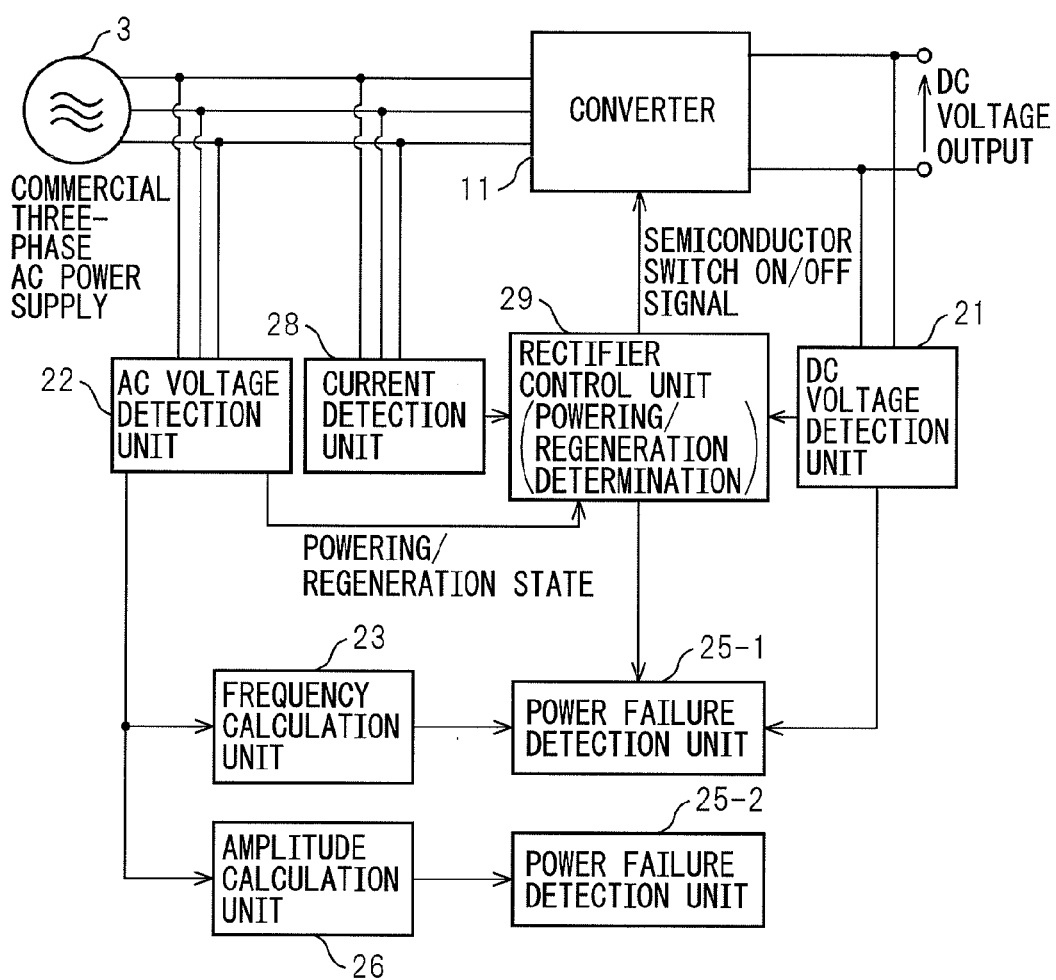
FIG. 5 is a circuit diagram showing a motor drive apparatus according to a modified example of the first embodiment of the present invention.

As a modified example of the first and second embodiments of the present invention, the above power failure detection unit may be used in combination with an additional power failure detection unit that calculates the amplitude of the AC voltage on the AC side of the 120-degree conduction mode rectifier 11 and that determines that a power failure has occurred when the amplitude value is smaller than a predetermined value, and the presence or absence of a power failure may be determined by ORing the two power failure detection units. This will be explained below by taking the first embodiment of the present invention as an example. FIG. 5 is a circuit diagram showing a motor drive apparatus according to a modified example of the first embodiment of the present invention. The power failure detection unit 25 in the first embodiment of the present invention described with reference to FIG. 1 is designated by reference numeral 25-1 in FIG. 5. The additional power failure detection unit 25-2 determines that a power failure has occurred when the amplitude of the AC voltage on the AC side of the 120-degree conduction mode rectifier 11, calculated by the amplitude calculation unit 26, is smaller than a predetermined value. When at least one of the power failure detection units 25-1 and 25-2 has determined that a power failure has occurred, it is than determined that a power failure has occurred on the AC side of the 120-degree conduction mode rectifier 11. A similar modification can be made to the second embodiment of the present invention.

Figure 6:
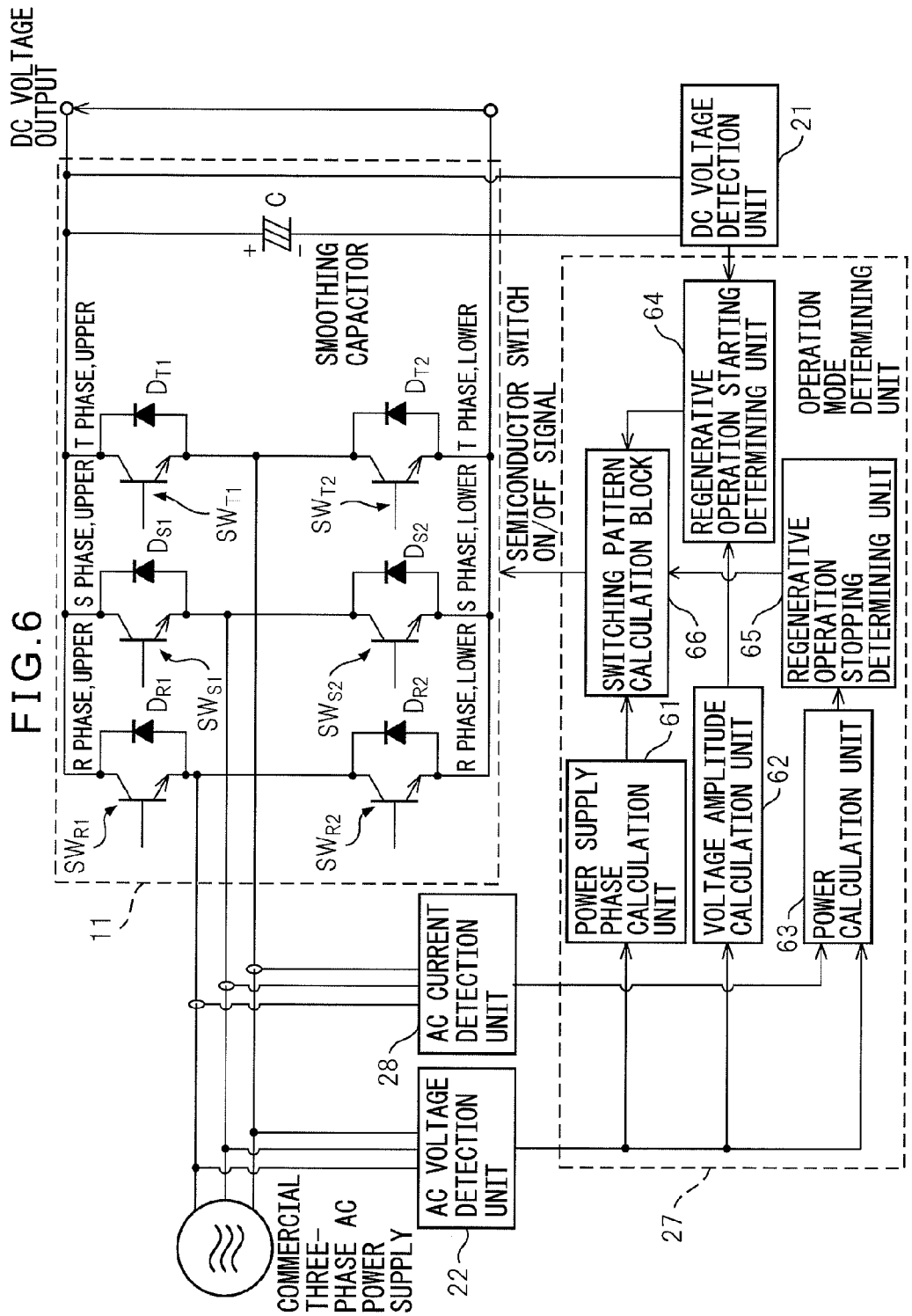
FIG. 6 is a circuit diagram showing the configuration of an operation mode detection unit in the motor drive apparatus 1 according to the first and second embodiments of the present invention.
Figure 7:
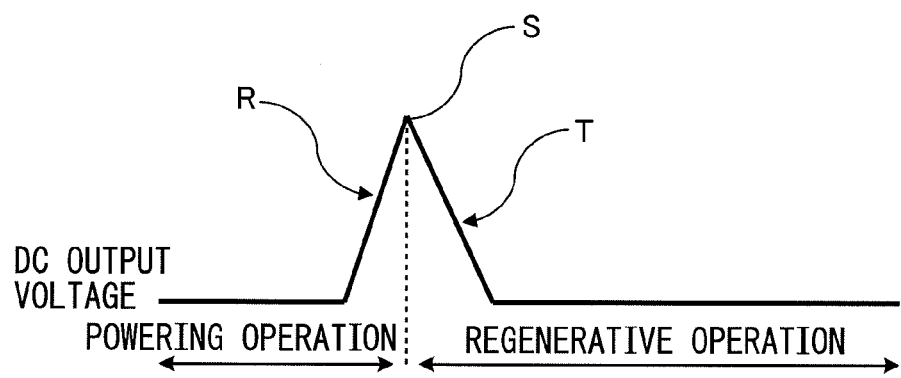
FIG. 7 is a diagram for explaining how a 120-degree conduction mode rectifier is switched between powering operation and regenerative operation.
Figure 8:
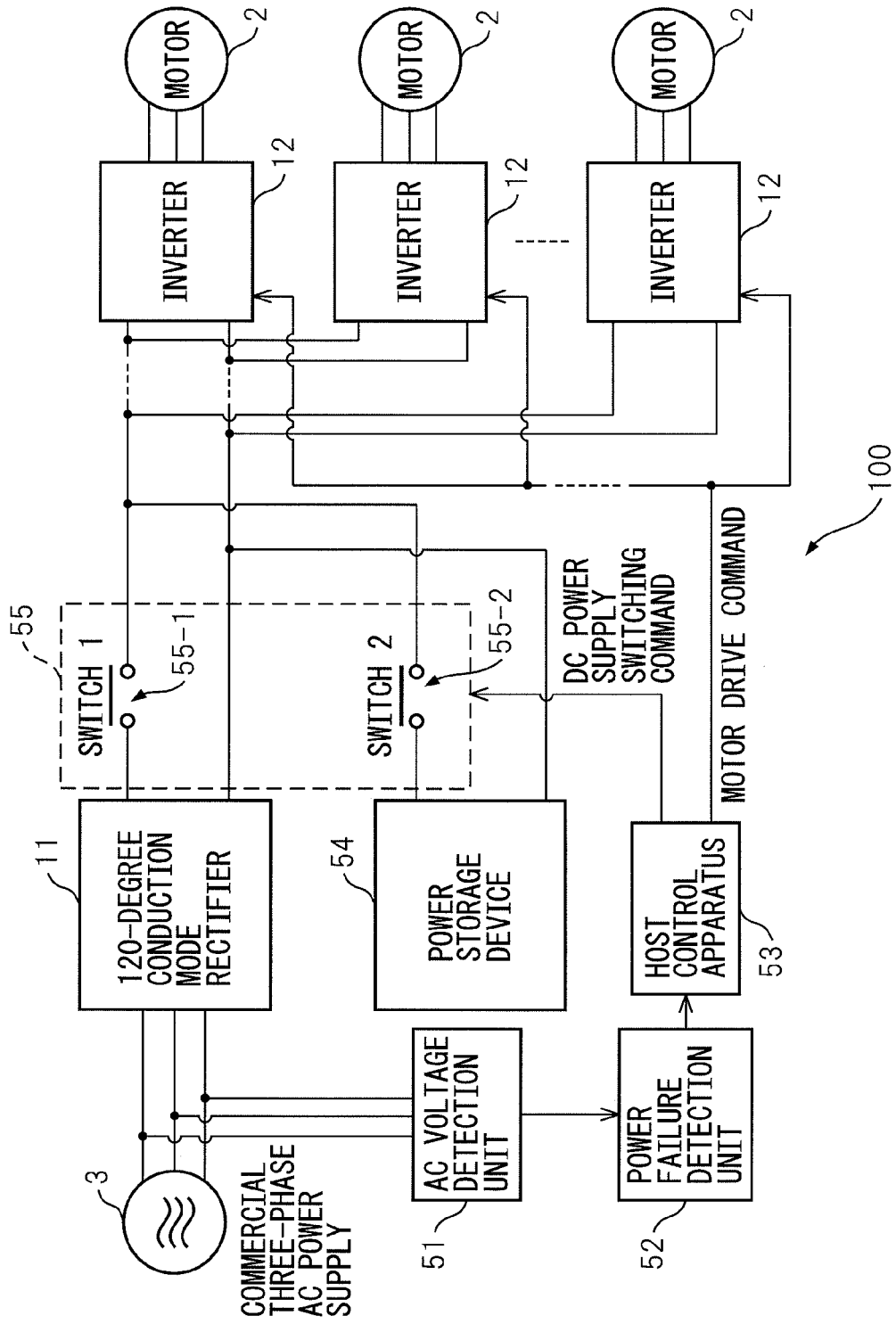
FIG. 8 is a diagram showing the configuration of a conventional motor drive apparatus for driving a plurality of motors.
Figure 9:
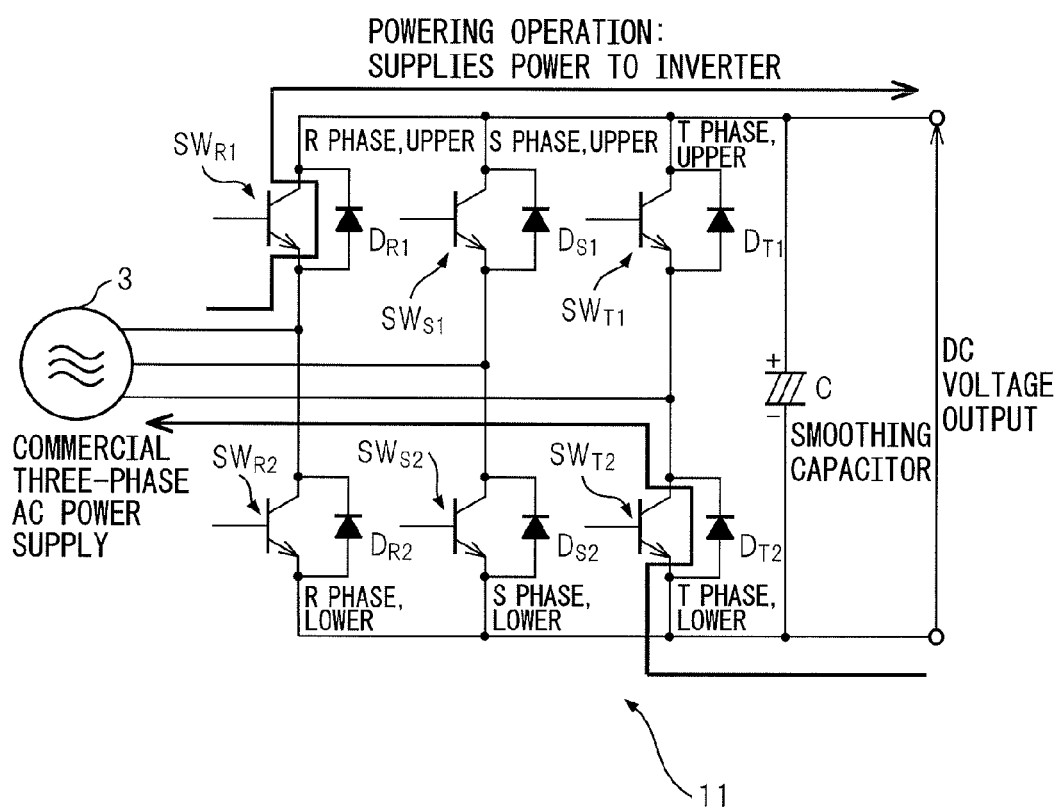
FIG. 9 is a circuit diagram for explaining currents flowing in a 120-degree conduction mode rectifier during the powering operation by the conventional motor drive apparatus.
Figure 10:
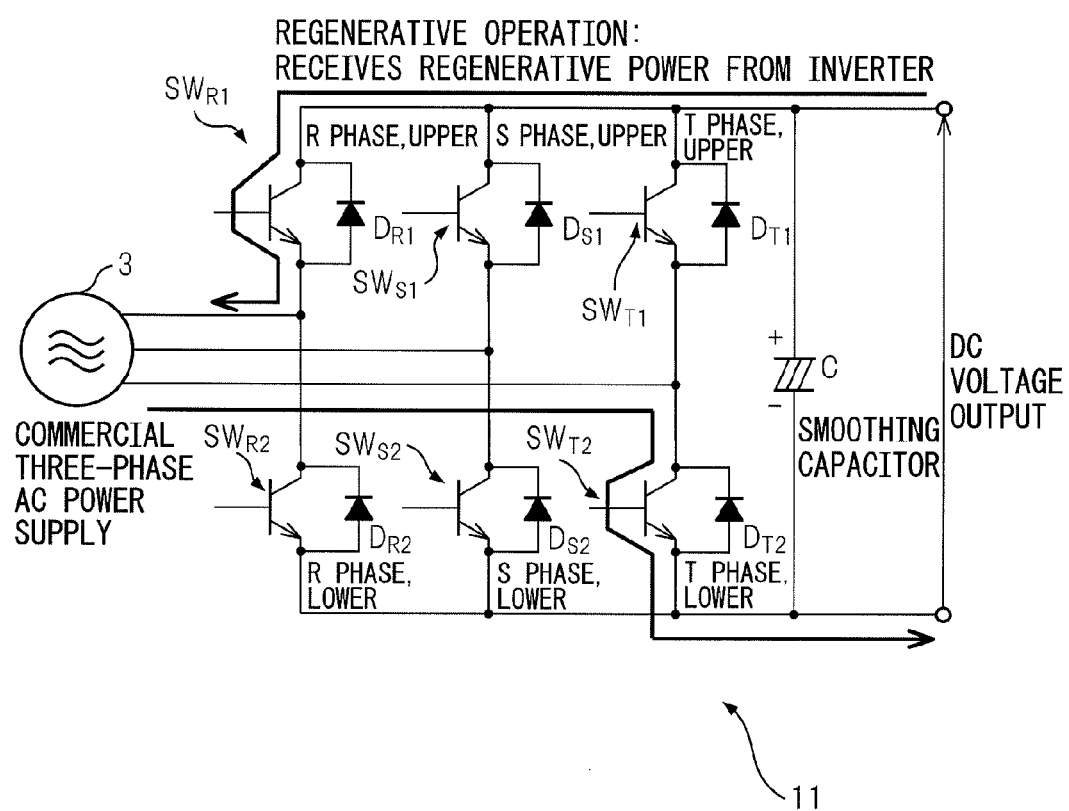
FIG. 10 is a circuit diagram for explaining currents flowing in the 120-degree conduction mode rectifier during the regenerative operation by the conventional motor drive apparatus.
Figure 11:
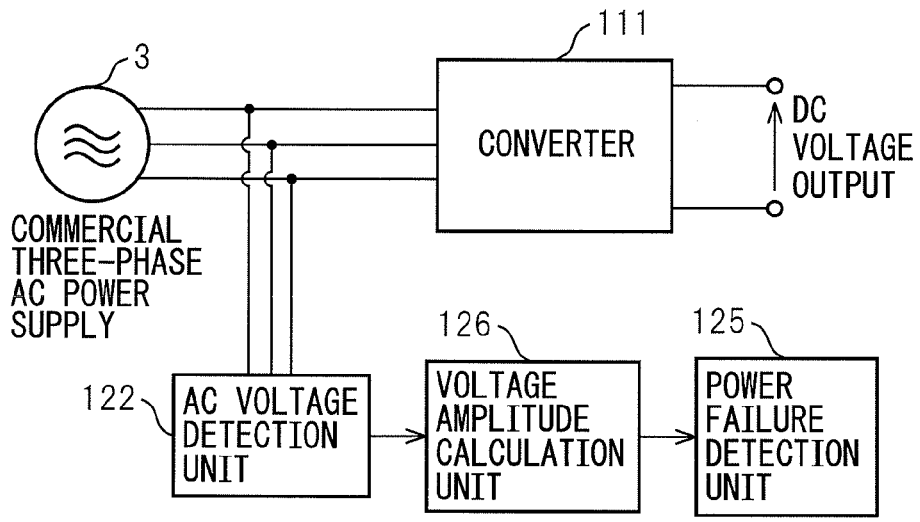
FIG. 11 is a circuit diagram showing a power failure detection unit for determining the presence or absence of a power failure based on the amplitude of a three-phase AC input voltage.
Figure 12:
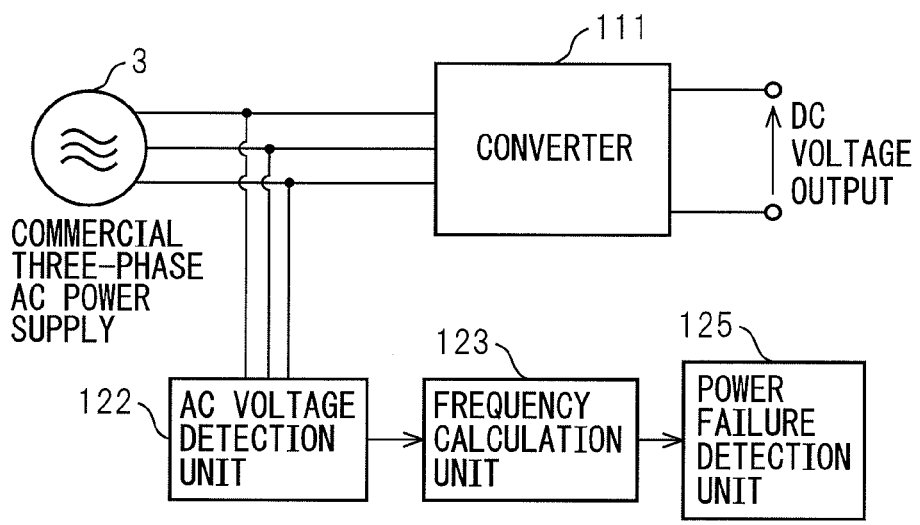
FIG. 12 is a circuit diagram showing a power failure detection unit for determining the presence or absence of a power failure based on the frequency of a three-phase AC input voltage.
Figure 13:
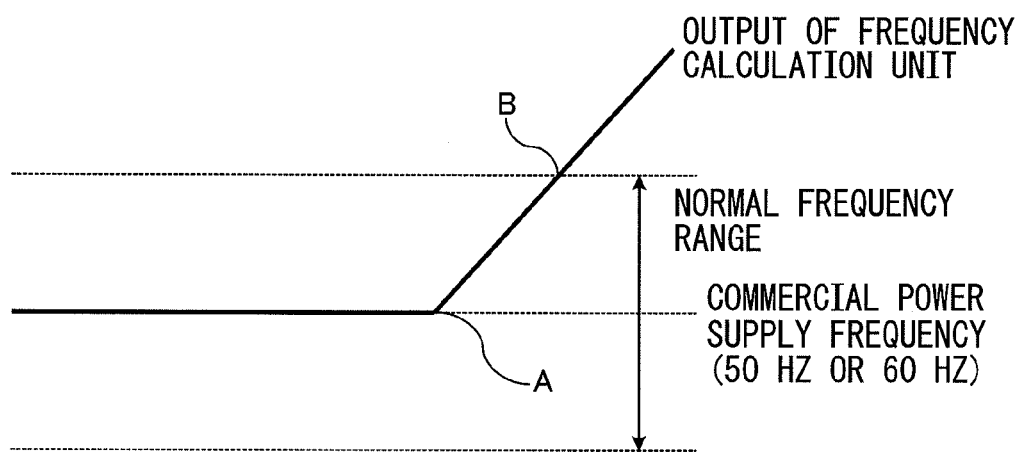
FIG. 13 is a diagram for explaining the basic concept of the power failure detection unit that determines the presence or absence of a power failure based on the frequency of the three-phase AC input voltage.
Figure 14:
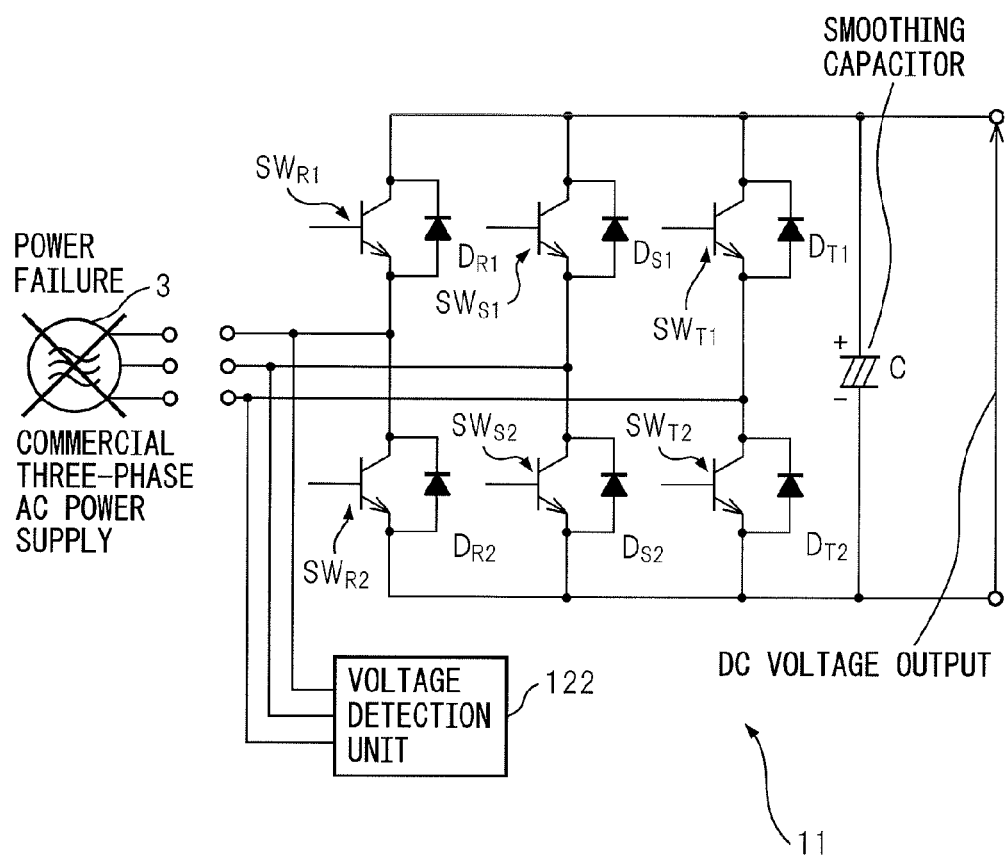
FIG. 14 is a diagram for explaining the problem associated with the power failure detection performed based on the voltage amplitude when a 120-degree conduction mode rectifier is used, and shows the power failure detection during the powering operation of the 120-degree conduction mode rectifier.
Figure 15:
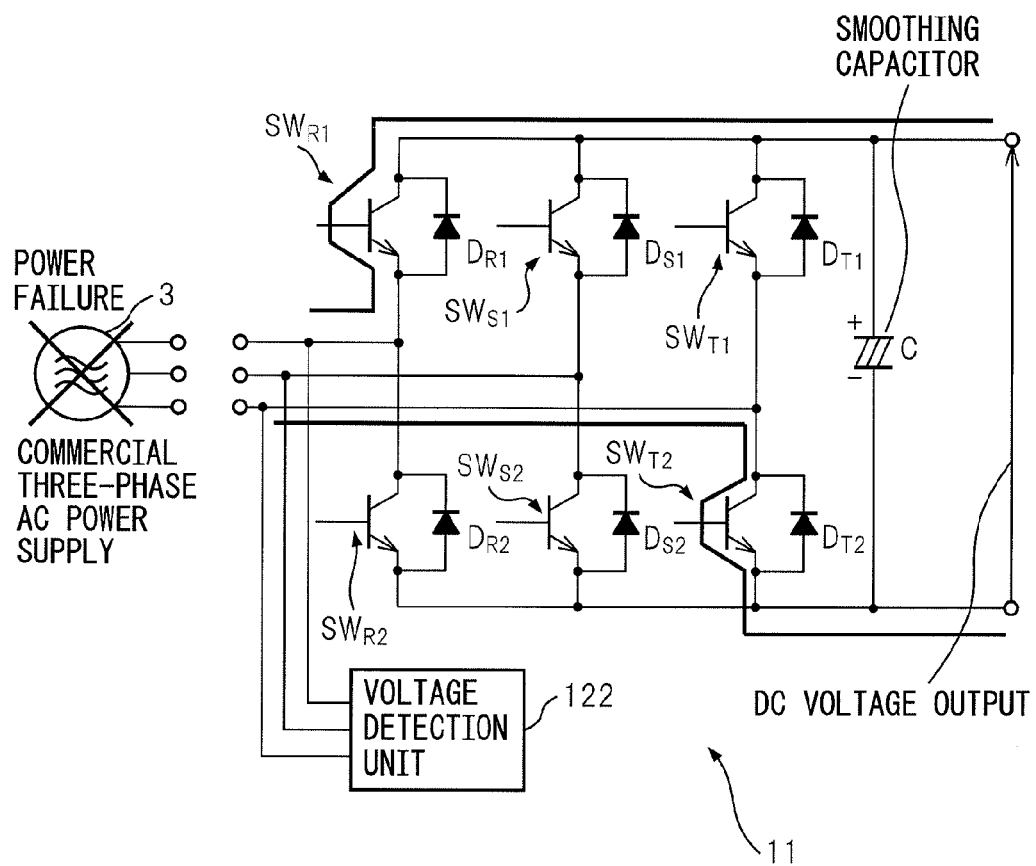
FIG. 15 is a diagram for explaining the problem associated with the power failure detection performed based on the voltage amplitude when the 120-degree conduction mode rectifier is used, and shows the power failure detection during the regenerative operation of the 120-degree conduction mode rectifier.
Figure 16:
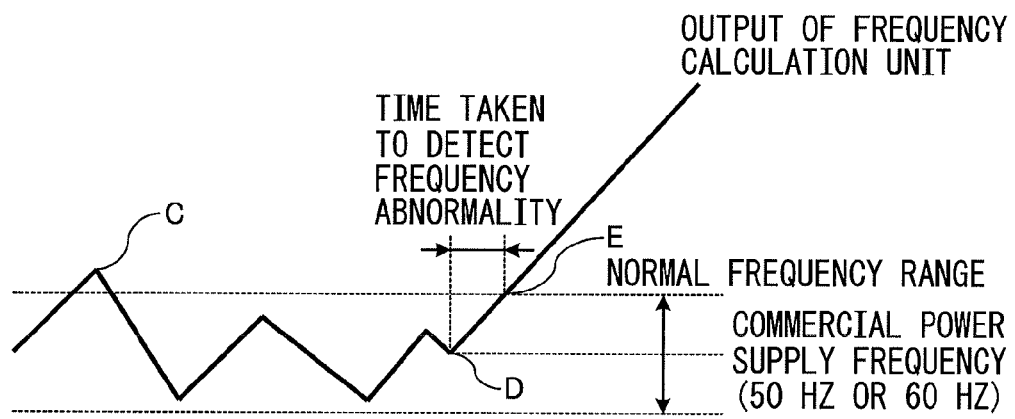
FIG. 16 is a diagram for explaining the problem associated with the power failure detection performed based on the voltage frequency when the 120-degree conduction mode rectifier is used, and shows the power failure detection when a normal frequency range is narrowed.
Figure 17:
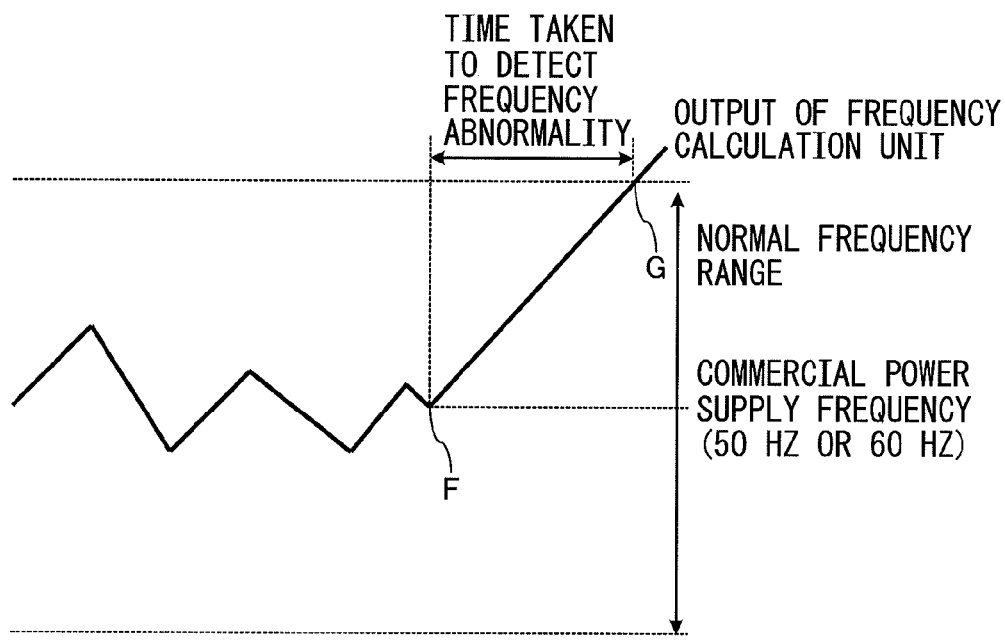
FIG. 17 is a diagram for explaining the problem associated with the power failure detection performed based on the voltage frequency when the 120-degree conduction mode rectifier is used, and shows the power failure detection when the normal frequency range is widened.

In the first and second embodiments of the present invention, since the power failure detection to be performed is determined based on whether the 120-degree conduction mode rectifier 11 is in powering operation or in regenerative operation, as described above, the motor drive apparatus 1 includes an operation mode determining unit 27 which determines whether the 120-degree conduction mode rectifier 11 is to be operated in powering mode or in regenerative mode. FIG. 6 is a block diagram showing the configuration of an operation mode detection unit in the motor drive apparatus 1 according to the first and second embodiments of the present invention. For simplicity of explanation, FIG. 6 focuses on the configuration of the operation mode determining unit 27. FIG. 7 is a diagram for explaining how the 120-degree conduction mode rectifier 11 is switched between powering operation and regenerative operation.

During the powering operation of the 120-degree conduction mode rectifier 11 with all the switches OFF, when regenerative power occurs from the motor 2, and the regenerative power begins to be fed from the inverter 12, the charge is stored on the smoothing capacitor C, and the DC voltage on the DC side of the 120-degree conduction mode rectifier 11 increases (time R in FIG. 7). Then, when the DC voltage detected by the DC voltage detection unit 21 has exceeded a predetermined value, or when the potential difference between the DC voltage detected by the DC voltage detection unit 21 and the amplitude of the phase-to-phase voltage on the AC side of the 120-degree conduction mode rectifier 11, calculated by a voltage amplitude calculation unit 62, has exceeded a predetermined value, a regenerative operation starting determining unit 64 in the operation mode determining unit 27 determines that the 120-degree conduction mode rectifier 11 is to be switched from the powering operation to the regenerative operation (time S in FIG. 7). In response to this determination, a switching pattern calculation unit 66 outputs a semiconductor switch ON/OFF signal so as to cause the 120-degree conduction mode rectifier 11 to perform the DC-to-AC conversion operation (i.e., regenerative operation) and, based on this signal, the 120-degree conduction mode rectifier 11 performs the DC-to-AC conversion operation (that is, regenerative operation). At this time, as long as there is no power failure on the AC side of the 120-degree conduction mode rectifier 11, the regenerative energy stored on the smoothing capacitor C is fed through the 120-degree conduction mode rectifier 11 back to the commercial three-phase AC power supply 3; as a result, the DC voltage being detected by the DC voltage detection unit 21 drops (time T in FIG. 7) and thereafter is maintained at a substantially constant value. When the supply of the regenerative power from the inverter 12 ends, the power on the AC side of the 120-degree conduction mode rectifier 11, calculated by a power calculation unit 63, is equal to a value at least not smaller than zero (that is, a nonnegative value). When the power on the AC side of the 120-degree conduction mode rectifier 11 has exceeded a predetermined threshold value, a regenerative operation stopping determining unit 65 determines that the regenerative operation is to be stopped, and notifies the switching pattern calculation unit 66 accordingly. Based on a command supplied from the regenerative operation starting determining unit 64 or the regenerative operation stopping determining unit 65, the switching pattern calculation block 66 creates the semiconductor ON/OFF signal to be supplied to the 120-degree conduction mode rectifier 11.

The frequency calculation unit 23, the power failure detection units 25, 25-1, and 25-2, the amplitude calculation unit 26, the operation mode determining unit 27, the voltage evaluation unit 31, the frequency abnormality detection unit 32, the regeneration stopping unit 33, the amplitude evaluation unit 34, etc., are implemented by an operational processor such as a DSP or an FPGA, and its operation is defined by a software program.

In a motor drive apparatus for driving motors used in such machines as machine tools, forging presses, injection molding machines, and various kinds of robots, including a 120-degree conduction mode rectifier for converting input AC power to DC power and inverters for converting the DC power output from the DC converter to AC power for driving the respective motors, the configuration of the present invention can be applied for detecting the presence or absence of a power failure on the AC side of the 120-degree conduction mode rectifier.

More specifically, in the motor drive apparatus according to the present invention, the AC power supplied from the AC power supply is converted by the 120-degree conduction mode rectifier to DC power which is further converted by the inverters to the AC power for driving the respective motors, and the presence or absence of a power failure on the AC side of the 120-degree conduction mode rectifier is determined by using the DC voltage detected on the DC side of the 120-degree conduction mode rectifier, the reference value, i.e., the DC voltage detected on the DC side of the 120-degree conduction mode rectifier at the start of the regenerative operation of the 120-degree conduction mode rectifier, and the frequency of the AC voltage detected on the AC side of the 120-degree conduction mode rectifier; with this configuration, the occurrence of a power failure at the AC power supply side can be detected to protect the apparatus even during the regenerative operation of the 120-degree conduction mode rectifier, and any possibility of erroneously determining that a power failure has occurred when no power failure has actually occurred can be eliminated.

According to a first mode of the present invention, during the regenerative operation of the 120-degree conduction mode rectifier, only when the DC voltage detected on the DC side of the 120-degree conduction mode rectifier is larger than the reference voltage and when the frequency of the AC voltage detected on the AC side of the 120-degree conduction mode rectifier is outside the normal frequency range, is it determined that a power failure has occurred on the AC side of the 120-degree conduction mode rectifier; as a result, not only can the occurrence of a power failure be detected more accurately, but any possibility of erroneously determining that a power failure has occurred when no power failure has actually occurred can be eliminated.

According to a second mode of the present invention, during the regenerative operation of the 120-degree conduction mode rectifier, only when the DC voltage detected on the DC side of the 120-degree conduction mode rectifier is larger than the reference voltage and when the frequency of the AC voltage detected on the AC side of the 120-degree conduction mode rectifier is outside the normal frequency range, is a command issued to stop the DC-to-AC power conversion operation of the 120-degree conduction mode rectifier and, when the amplitude of the AC voltage detected at this time on the AC side of the 120-degree conduction mode rectifier is equal to or smaller than a predetermined value, it is determined that a power failure has occurred on the AC side of the 120-degree conduction mode rectifier; as a result, not only can the occurrence of a power failure be detected more accurately, but any possibility of erroneously determining that a power failure has occurred when no power failure has actually occurred can be eliminated.

What is claimed is:

1. A motor drive apparatus a 120-degree conduction mode rectifier which, during powering operation, converts AC power supplied from an AC side to DC power for output and, during regenerative operation, converts DC power supplied from a DC side to AC power for output;
an inverter which, during powering operation, converts the DC power output by the 120-degree conduction mode rectifier to AC power and supplies the AC power as drive power to a motor, and which, during regenerative operation, converts regenerative AC power recovered from the motor to DC power and returns the DC power to the 120-degree conduction mode rectifier;
a DC voltage detection unit which detects a DC voltage on the DC output side of the 120-degree conduction mode rectifier;
an AC voltage detection unit which detects an AC voltage on the AC output side of the 120-degree conduction mode rectifier;
a frequency calculation unit which calculates the frequency of the AC voltage detected by the AE voltage detection unit;
a storage unit which stores as a reference value the DC voltage detected by the DC voltage detection unit at the start of the regenerative operation of the 120-degree conduction mode rectifier; and
a power failure detection unit which the AC side of the 120-degree conduction mode rectifier during the regenerative operation of the 120-degree conduction mode rectifier, by using the DC voltage detected by the DC voltage detection unit, the reference frequency calculated by the frequency calculation unit,
wherein the power failure detection unit includes:
a voltage evaluation unit which determines whether the DC voltage detected by the DC voltage detection unit during the regenerative operation of the 120-degree conduction mode rectifier is larger than the reference value; and
a frequency abnormality detection unit calculated by the frequency calculation unit is outside a normal frequency range when it is determined by the voltage evaluation unit that the DC voltage detected by the DC voltage detection unit during the regenerative operation of the 120-degree conduction mode rectifier is larger than the reference value, and wherein
when the frequency abnormality detection unit has detected that the AC voltage frequency calculated by the frequency calculation unit has been outside the normal frequency range continuously for a predetermined period of time, the power failure detection unit determines that a power failure has occurred on the AC side of the 120-degree conduction mode rectifier.

2. The motor drive apparatus according to claim 1, wherein the normal frequency range is a range of frequencies centered about the frequency calculated by the frequency calculation unit at the start of the regenerative operation of the 120-degree conduction mode rectifier.

3. A motor drive apparatus comprising:
a 120-degree conduction mode rectifier which, during powering operation, converts AC power supplied from an AC side to DC power for output and, during regenerative operation, converts DC power supplied from a DC side to AC power for output;
an inverter which, during powering operation, converts the DC power output by the 120-degree conduction mode rectifier to AC power and supplies the AC power as drive power to a motor, and which, during regenerative operation, converts regenerative AC power recovered from the motor to DC power and returns the DC power to the 120-degree conduction mode rectifier;
a DC voltage detection unit which detects a DC voltage on the DC output side of the 120-degree conduction mode rectifier;
an AC voltage detection unit which detects an AC voltage on the AC output side of the 120-degree conduction mode rectifier;
a frequency calculation unit which calculates the frequency of the AE voltage detected b the AC voltage detection unit;
a storage unit which stores as a reference value the DC voltage detected by the DC voltage detection unit at the start of the regenerative operation of the 120-degree conduction mode rectifier;
a power failure detection unit which determines the presence or absence of a power failure on the AC side of the 120-degree conduction mode rectifier during the regenerative operation of the 120-degree conduction mode rectifier, by using the DC voltage detected by the DC voltage detection unit, the reference value stored in the storage unit, and the AC voltage frequency calculated by the frequency calculation unit; and
an amplitude calculation unit which calculates the amplitude of the AC voltage detected b the AC voltage detection unit,
wherein the power failure detection unit includes:
a voltage evaluation unit which determines whether the DC voltage detected by the DC voltage detection unit during the regenerative operation of the 120-degree conduction mode rectifier is larger than the reference value;
a frequency abnormality detection unit which determines whether the AC voltage frequency calculated by the frequency calculation unit is outside the normal frequency range when it is determined by the voltage evaluation unit that the DC voltage detected by the DC voltage detection unit during the regenerative operation of the 120-degree conduction mode rectifier is larger than the reference value;
a regeneration stopping unit which causes the DC-to-AC power conversion operation of the 120-degree conduction mode rectifier to stop when the frequency abnormality detection unit has detected that the AC voltage frequency calculated by the frequency calculation unit has been outside the normal frequency range continuously for predetermined period of time; and
an amplitude evaluation unit which detects whether or not the AC voltage amplitude calculated by the amplitude calculation unit is equal to or smaller than a predetermined value, and wherein
after the conversion operation of the 120-degree conduction mode rectifier has been caused to stop by the regeneration stopping unit, when the amplitude evaluation unit has detected that the AC voltage amplitude calculated by the amplitude calculation unit is equal to or smaller than the predetermined value, the power failure detection unit determines that a power failure has occurred on the AC side of the 120-degree conduction mode rectifier.

4. The motor drive apparatus according to claim 3, wherein the normal frequency range is a range of frequencies centered about the frequency calculated by the frequency calculation unit at the start of the regenerative operation of the 120-degree conduction mode rectifier.

\* \* \* \* \*